Figure 1:
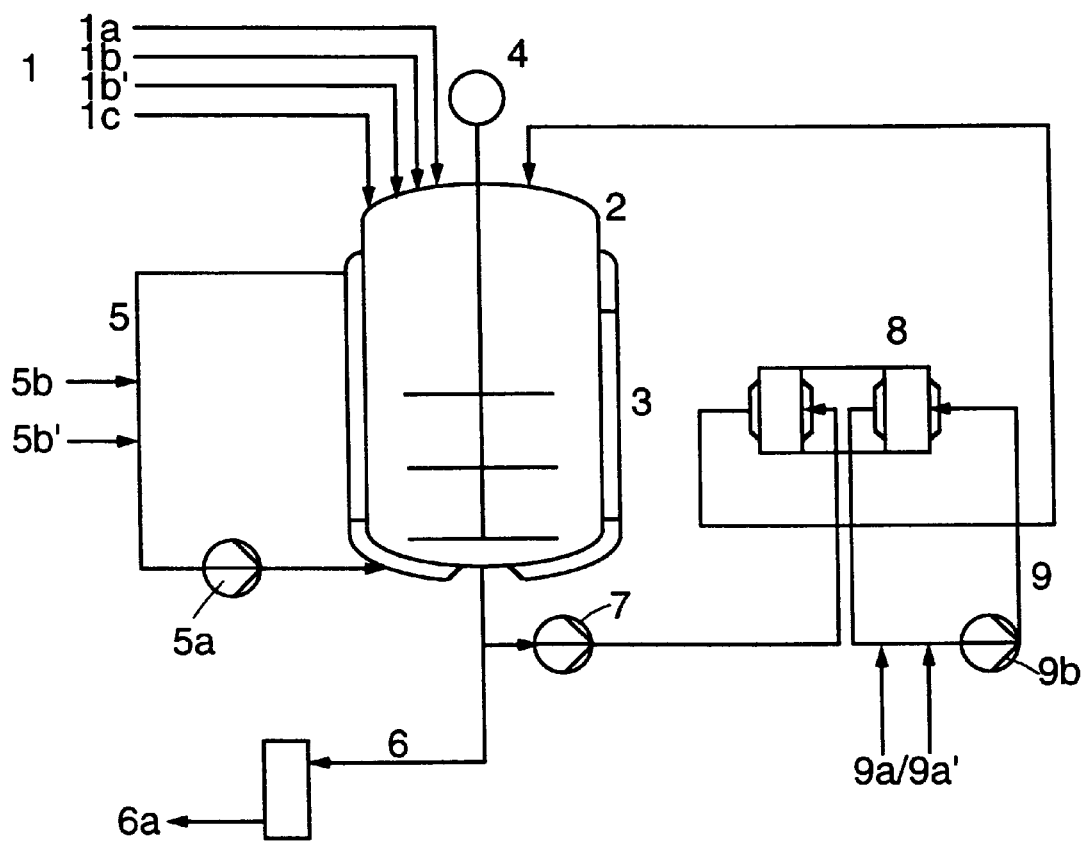

United States Patent

Mathauer et al.

[11] Patent Number: 6,117,939
[45] Date of Patent: Sep. 12, 2000

[54] FREE RADICAL MINIEMULSION POLYMERIZATION WITH LOW SHEAR AND HEAT EXCHANGER

[75] Inventors: Klemens Mathauer, Ludwigshafen; Hubertus Kröner, Neustadt; Andreas Keller, Böhl-Iggelheim; Walter Kastenhuber, Mannheim, all of Germany

[73] Assignee: BASF Aktiengesellschaft, Ludwigshafen, Germany

[21] Appl. No.: 09/189,402

[22] Filed: Nov. 10, 1998

[30] Foreign Application Priority Data

Nov. 12, 1997 [DE] Germany .................. 197 50 159

[51] Int. Cl.$^7$ .................. C08J 3/03; C08L 31/02; C08L 35/02
[52] U.S. Cl. .................. 524/832; 524/457; 524/920
[58] Field of Search .................. 524/832, 457; 526/920

[56] References Cited

U.S. PATENT DOCUMENTS 5,399,618   3/1995   Jenkins et al. .................. 524/817
5,686,518  11/1997   Fonternot et al. .................. 524/458
5,990,221  11/1999   Dames et al. .................. 524/457

FOREIGN PATENT DOCUMENTS 0 486 262   5/1992   European Pat. Off. .
0 526 741   2/1993   European Pat. Off. .
0 608 567   8/1994   European Pat. Off. .

OTHER PUBLICATIONS

Database WPI, Derwent Publications, AN 96–277726/28, DE 4442577, Nov. 30, 1994.

Database WPI, Derwent Publications, AN 98–195436/18, DE 19640793, Oct. 2, 1996.

*Primary Examiner*—David W. Wu
*Assistant Examiner*—Kelechi C. Egwim
*Attorney, Agent, or Firm*—Oblon, Spivak, McClelland, Maier & Neustadt, P.C.

[57] ABSTRACT

A process for preparing an aqueous polymer dispersion by free-radical polymerization of compounds I and II whose individual solubility in water is very different by the miniemulsion polymerization technique, in which process the reaction mixture is agitated by an external circuit which leads from and back again to the reaction vessel and comprises at least one low-shear pump and at least one heat exchanger having an essentially laminar flow profile. The copolymers prepared in accordance with the invention can be produced in a good yield within short times and exhibit good performance properties.

6 Claims, 2 Drawing Sheets

FREE RADICAL MINIEMULSION POLYMERIZATION WITH LOW SHEAR AND HEAT EXCHANGER

The invention relates to a process for preparing an aqueous polymer dispersion by the miniemulsion polymerization technique and to an apparatus for implementing the process.

Polymer dispersions are usually prepared by the emulsion polymerization technique. In this technique, the monomers to be polymerized are dispersed in an aqueous reaction medium, in the presence of emulsifiers (dispersing auxiliaries) and water-soluble initiators, through application of shear forces. Without an excessive input of dispersion energy, such as by customary stirring, the conventional techniques give oil-in-water emulsions whose disperse phase consists essentially of droplets with a diameter >1000 nm. At the emulsifier concentrations used, which are above the critical micelle concentration, the adding on of emulsifier molecules to the monomer droplets at the oil/water interface is accompanied by the agglomeration of emulsifier molecules in the aqueous phase to form micelles, into which monomer molecules may diffuse from the monomer droplets. Because of their small size and large number, these micelles function predominantly as centers for the free-radical polymerization that is started by the capture of the water-soluble initiator radicals. The function of the monomer droplets is merely that of a reservoir from which there is a continuous supply of monomers to the polymerization that is taking place in the micelles. A prerequisite for this, however, is the adequate solubility in water of the monomers that are to be polymerized. Since the monomer droplets are relatively large, this form of aqueous free-radical emulsion polymerization is referred to as free-radical aqueous macroemulsion polymerization, the initial emulsion also being referred to as an aqueous macroemulsion.

However, the limits of this principle become evident when the monomers that are to be copolymerized comprise not only those which can be polymerized by free-radical aqueous macroemulsion polymerization but also those such as stearyl acrylate or vinyl stearate whose solubility in water under polymerization conditions is <0.001% by weight, based on the saturated aqueous solution [Moore estimated the solubility of vinyl stearate in water (cf. J. Polym. Sci., Part A-1, 1967, 5, 2665) to be $10^{-10}$ mol/dm$^3$].

Owing to their inadequate solubility in water, such monomers are unable to be transported at a sufficient rate to the polymerization sites, which in the case of free-radical aqueous macroemulsion polymerization are located in the continuous, aqueous phase. They therefore remain behind as residual droplets of the original monomer droplets, and are essentially not incorporated into the polymer particles. In many cases, however, it is precisely the copolymerization of hydrophilic monomers of this kind which is desired in order to maximize the hydrophobicity of the subsequent films of the resulting aqueous polymer dispersion formed in the fields of application.

The fact that in free-radical aqueous macroemulsion polymerization the monomer droplets dispersed in the aqueous medium are not the actual sites of polymerization is also disadvantageously manifest when organic auxiliaries which are of low solubility in water, such as plasticizers, substances which improve the tackiness of the resulting film, film-forming auxiliaries, or other organic additives, are to be incorporated into the aqueous polymer dispersion.

Although these substances are in general compatible with the monomer phase, if incorporated into the monomer phase before the beginning of the free-radical aqueous macroemulsion polymerization they too remain behind as residual droplets of the original monomer droplets and, in the resulting aqueous polymer dispersion, form separate particles which differ, usually considerably, in their mass density and size from the polymer particles formed, a circumstance which may lead to sedimentation, flotation and/or coagulation. What would be desirable, in contrast, would be for these additives to reside in the dispersed polymer particles themselves, which is something that can normally not be achieved, or only with great difficulty, by the subsequent incorporation of such additives into the finished aqueous polymer dispersion.

The problems highlighted above associated with free-radical aqueous macroemulsion polymerization can be remedied, conventionally, by taking special measures to reduce the size of the monomer droplets in the aqueous emulsion of monomers (and, if used, of additives) to such an extent that these droplets predominantly have a diameter $\leq 500$ nm. If, at the same time, the amount of monomer chosen is such that there is essentially no micelle formation in the aqueous medium, then the oligomer radicals are captured by the small monomer droplets, which have a comparatively large overall surface area, and polymerization takes place within the monomer droplets themselves.

Deriving from the small size of the monomer droplets, this method of free-radical aqueous emulsion polymerization is termed free-radical aqueous miniemulsion polymerization, and the aqueous initial emulsion is referred to as a monomer miniemulsion. Using the method of free-radical aqueous miniemulsion polymerization, it is possible with ease to copolymerize even particularly hydrophobic monomers (including, for example, macromonomers (such as oligopropene acrylates) i.e. oligomers or polymers having at least one ethylenically unsaturated double bond). If other hydrophobic additives are incorporated, prior to the production of the aqueous monomer miniemulsion, into the monomers which are to be polymerized, then these additives are, advantageously, also still present—in chemically and/or physically bonded form—in the dispersed polymer particles.

The polymerization temperature in the case of free-radical aqueous miniemulsion polymerization is usually from 30 to 100° C., preferably from 60 to 95° C., although if superatmospheric pressure is applied it may even be up to 120° C. or more. The advantage of high polymerization temperatures is primarily the heightened polymerization rate. A problem, however, is that free-radical polymerizations are extremely exothermic. As a result there may be instances of local overheating, which may frequently lead to secondary reactions or a lack of uniformity in molecular mass distribution or particle size. Nevertheless, conducting the reaction at relatively high temperatures is an important measure for large-scale industrial units since the reaction times can be significantly reduced; in other words, an industrial process is carried out with lower cycle times, which helps save on investment costs for a larger number of units. A major problem which then has to be solved, however, is the dissipation of heat.

EP-A 0 486 262 discloses the preparation of emulsion copolymers where the energy balance is monitored in order to control the supply of the comonomers and the temperature. The temperature is guided using, inter alia, an external heat exchanger. No information is given about the quality of the products or the construction of the pumps or heat exchangers.

For use in the suspension polymerization of VC to give homo- or copolymers, in a reactor with stirrer and external heat exchanger, EP-A 0 608 567 describes a special pump (Hydrostal pump) through which the reaction mixture is guided at an angle of 90°, its interior having a conical hub with an impeller blade which performs a spirally rotating movement. No remarks are made about the heat exchanger. The stirring energy and circulation energy have to be set at a certain ratio. A comparable pump is also employed in EP-B 0 526 741, which also addressed the suspension polymerization of vinyl chloride (VC); there, the type of heat exchanger is regarded as uncritical (see p. 4, lines 36 to 40).

In the process for preparing emulsion polymers in accordance with DE-A 44 42 577 the energy released in the course of the exothermic reaction is partly dissipated by distilling off a water/monomer mixture from the reaction vessel (a stirred reactor) under subatmospheric pressure. Although this process measure achieves a certain reduction in the polymerization time, i.e. essentially the time over which the monomer or monomers is or are added, it is still not sufficiently suitable for large-scale industrial units, especially since the scope for its application—for example, its use for low-boiling comonomers or comonomers which are gaseous under standard conditions (of the butadiene type, for example)—if present at all, is minimal.

DE-A 196 40 793, which has an earlier priority but is not a prior publication, describes a process for preparing homo- or copolymers by the emulsion polymerization technique, where the reaction mixture is agitated by an external circuit which has a low-shear pump and a heat exchanger with an essentially laminar flow profile. No mention is made of its deployment in the miniemulsion technique.

It is an object of the present invention to provide a process for preparing polymer dispersions by the miniemulsion polymerization technique which can be conducted on the industrial scale and which allows short reaction times, accepts a broad spectrum of different monomers, including those which are gaseous under standard conditions, and leads to products which in terms of their performance properties are at least comparable with existing products.

We have found that this object is achieved by starting from a process for preparing an aqueous polymer dispersion by free-radically initiated polymerization of free-radically polymerizable compounds I whose individual solubility in water under the conditions (pressure, temperature) of the free-radically initiated polymerization is >0.001% by weight and whose polymer particles that form in the process also comprise further compounds II whose solubility in water under the conditions of the free-radically initiated polymerization is <0.001% by weight, in which process a) a mixture comprising at least one compound I and at least one compound II is used to prepare an oil-in-water miniemulsion (emulsion I) whose disperse phase consists essentially of droplets having a diameter <500 nm and b) the emulsion I is supplied continuously, at least in part, as feed stream I to a reaction vessel in the course of continuing free-radical polymerization. The feature of the invention is that the reaction mixture is agitated by an external circuit which leads from and back to the reaction vessel and which comprises at least one low-shear pump and at least one heat exchanger having an essentially laminar flow profile.

It is possible to conduct the process of the invention by initially charging a certain amount of water to the polymerization vessel, heating this initial charge to the polymerization temperature, and supplying the aqueous emulsion I and the free-radical polymerization initiator, generally as an aqueous solution, continuously to the polymerization vessel by way of spatially separate feed ports. An alternative option is to supply continuously, at the rate of their consumption, water with or without a first portion of the emulsion I, in a first stage, the polymerization initiator, in a second stage, and the remainder or the full amount of emulsion I as feed stream I, in a third stage.

If a polymerization zone is supplied continuously with an aqueous monomer miniemulsion at the rate at which it is consumed, in the course of continuing polymerization, then monomer droplets supplied at a later point in time always encounter monomer droplets that have already undergone free-radical initiation. As in the case of the free-radical aqueous macroemulsion polymerization, the uninitiated monomer droplets act as a reservoir of monomers for the initiated monomer droplets. This alters their composition, which in the case of their subsequent initiation may result in inhomogeneities in the composition of the resulting polymer particles. In the worst case scenario, the hydrophobic droplet constituents remain as residual drops and cause coagulation or creaming.

To take account of these circumstances, the process of the invention is preferably carried out in a manner such that the feed stream I contains only part of the compound(s) I and the feed stream I is accompanied at least at certain times by at least one further feed stream II, with the proviso that the feed stream II is a feed stream of another part of the compound(s) I and/or is an oil-in-water macroemulsion of the compound(s) I (emulsion II) whose disperse phase consists essentially of droplets having a diameter >1000 nm.

Suitable compounds I are all those monomers containing at least one ethylenically unsaturated group which are normally employed in the context of free-radical aqueous macroemulsion polymerization. Suitable compounds I are specified in DE-A 196 28 143, which has an earlier priority but which is not a prior publication.

In addition to monomers containing ethylenically unsaturated double bonds the compounds I may comprise in a minor amount, usually from 0.01 to 2% by weight based on the monomers to be polymerized, substances which regulate the molecular weight in the course of free-radical polymerizations, such as mercaptans, e.g. tert-dodecyl mercaptan or 3-mercaptopropyltrimethoxysilane.

The compounds I preferably comprise and in particular consist of

| | |
|---|---|
| a) from 80 to 100% by weight | of at least one monomer from the group consisting of styrene, α-methylstyrene, vinyltoluenes, esters of $C_3$—$C_6$ α, β-monoethylenically unsaturated carboxylic acids and $C_1$—$C_{12}$-alkanols, butadiene and also vinyl esters and allyl esters of $C_1$—$C_{12}$ alkane carboxylic acids (monomers A) and |
| b) from 0 to 20% by weight | of other compounds I containing at least one ethylenically unsaturated group (monomers B) | and, if desired, from 0.01 to 2% by weight, based on the sum of the monomers A and B, of molecular weight regulators.

Particularly preferred monomers A are n-butyl acrylate, 2-ethylhexyl acrylate, methyl methacrylate and styrene.

Preferred monomers B are acrylamide, methacrylamide, acrylic acid, acrylonitrile, methacrylonitrile, 2-acryloamido-2-methylpropanesulfonic acid, vinylpyrrolidone, hydroxyethyl acrylate, hydroxymethyl acrylate, hydroxypropyl acrylate, hydroxypropyl methacrylate, quaternized vinylimidazole, N,N-dialkylaminoalkyl (meth)acrylates, N,N-dialkylaminoalkyl(meth)acrylamides, trialkylammoniumalkyl (meth)acrylates and trialkylammoniumalkyl (meth)acrylamides. The expression (meth)acrylic as used herein is an abbreviation for methacrylic or acrylic.

Further preferred embodiments, however, include those where the compounds I are composed of

| | |
|---|---|
| - from 70 to 100% by weight | of esters of acrylic and/or methacrylic acid with $C_1$—$C_{12}$-alkanols and/or styrene, |
| or | |
| - from 70 to 100% by weight | of styrene and/or butadiene, |
| or | |
| - from 70 to 100% by weight | of vinyl chloride and/or vinylidene chloride, |
| or | |
| - from 40 to 100% by weight | of vinyl acetate, vinyl propionate and/or ethylene. |

The compounds II may likewise contain monoethylenically unsaturated groups. In this case they should be counted with the monomers to be polymerized. Very generally, monomers suitable as copolymerizable compounds II are those whose solubility at 25° C. and 1 bar is less than the solubility of lauryl acrylate (in some cases lauryl acrylate can also be used itself as a possible compound II). Such compounds II are specified in DE-A 196 28 143, page 11, line 21 to page 12, line 47. Preference is given to p-tert-butylstyrene, esters of $C_3$–$C_6\alpha$, $\beta$-monoethylenically unsaturated carboxylic acids and alkanols having more than 12 carbons (generally up to 30 carbons), such as stearyl acrylate, and esters of vinyl alcohol or allyl alcohol and alkane carboxylic acids having more than 12 carbons (generally up to 30 carbons), such as vinyl stearate.

Given a low solubility in water, even compounds of relatively high molecular weight containing no ethylenically unsaturated groups may be suitable compounds II. An example that may be mentioned here is Acronal® A 150 F, a poly-n-butyl acrylate from BASF AG, Ludwigshafen, Germany. Other possible compounds II are resins, such as colophony resins and hydrocarbon resins.

Further compounds suitable as possible compounds II (which are frequently employed in the form of mixtures) are other water-insoluble, oil-soluble substances, such as aliphatic and aromatic hydrocarbons (e.g. hexadecane), oil-soluble silicone compounds, film-forming auxiliaries or plasticizers, such as Plastilit® 3060 (a polypropylene glycol akylphenyl ether plasticizer) from BASF AG, Ludwigshafen, Germany. It is of course also possible for the compounds II that are used to comprise molecular weight regulators (e.g. water-insoluble mercaptans). Based on the amount of monomers to be free-radically polymerized in accordance with the invention, the proportion thereof will normally not exceed 2% by weight.

The aqueous emulsion I that is required in accordance with the invention can be prepared in a simple and conventional manner by mixing together the compounds I and II and first of all simply stirring the mixture into an aqueous solution comprising a dissolved emulsifier and so producing an aqueous monomer macroemulsion. The aqueous emulsifier solution here may even already include pH buffer substances, such as sodium hydrogen carbonate, which place the pH of the aqueous medium in a favorable range during the subsequent free-radical polymerization. As emulsifier it is preferred to use anionic and/or nonionic emulsifiers. However, the use of cationic emulsifiers is also possible in principle. It is possible to employ all those emulsifiers whose applicability for free-radical aqueous macroemulsion polymerization is known (oil-in-water emulsifiers).

Customary emulsifiers are known to the skilled worker and are described, for example, in Houben-Weyl, Methoden der organischen Chemie, volume XIV/1, Georg-Thieme Verlag, Stuttgart 1961, on pages 192 to 208. Known compounds are alkyl polyglycol ethers, such as ethoxylated lauryl alcohol, alkylphenol glycol ethers, such as those of nonylphenol, or salts of long-chain alkyl, aryl or alkylaryl acids, such as sodium lauryl sulfate. In addition to these it is also possible for protective colloids to be present, such as cellulose ethers or polyvinyl alcohol.

In accordance with the invention the amount of emulsifier is judiciously chosen such that in the ultimate aqueous emulsion I, within the aqueous phase, the critical micelle concentration of the emulsifiers used is essentially not exceeded. Based on the amount of compounds I and II present in the aqueous emulsion L this amount of emulsifier is generally within the range from 0.1 to 5% by weight.

The aqueous monomer macroemulsion obtainable as described can subsequently be homogenized in a customary manner to give the emulsion I required in accordance with the invention (cf. P. L. Tang, E. D. Sudol, C. A. Silebi and M. S. El-Aasser in Journal of Applied Polymer Science, Vol. 43 (1991) pp. 1059–1066). This is generally done using high-pressure homogenizers. The fine dispersion of the components is achieved in these machines by means of a high local input of energy. This can be done by compressing the aqueous monomer macroemulsion—as in the Niro-Soavi high-pressure homogenizer model NS1001 Panda—to over 1000 bar using a piston pump and then releasing it through a narrow gap, or by releasing the compressed aqueous monomer macroemulsion—as in the case of the Microfluidizer model 120 E from Microfluidics Corp.—into a mixing chamber through two nozzles which are directed against one another. Homogenization can also be brought about—as in the Branson Sonifier II 450—by the use of ultrasound.

The average size of the droplets of the aqueous emulsion I to be used in accordance with the invention can be determined, as set out in more detail in DE-A 196 28 143, in accordance with the principle of quasielastic light scattering as the z-average particle diameter $d_z$ of the unimodal analysis of the autocorrelation function. In general the values for $d_z$ are $\leq 500$ nm, preferably from 40 to 400 nm, with particular preference from 100 to 300 nm and, especially, from 100 to 200 nm.

The aqueous emulsions I to be used in accordance with the invention normally comprise at least 0.5% by weight of compounds II, based on the weight of the compounds I present. There is no upper limit on this amount of compounds II present. This statement is valid in particular when the compounds I used are exclusively those which themselves contain at least one free-radically polymerizable unsaturated group. In general, however, this content of compounds II will not exceed 200% by weight, and will frequently be $\leq 100\%$ by weight. Further embodiments in accordance with the invention include those in which said content of compounds II is from 1 to 50% by weight, or from 2 to 30% by weight, or from 5 to 15% by weight.

Suitable constituents of the feed stream II are in principle all those compounds I which can also be a constituent of the aqueous emulsion I. In general, however, the compounds I present in the feed stream II are selected such that their individual molal solubility in water under the polymerization conditions is greater than the corresponding water-solubility of that compound I of the aqueous emulsion I that is the least soluble in water under polymerization conditions. Preferably, however, the individual molal solubility of the compounds I of the feed stream II under the polymerization conditions, in water, should be poorer than in the dispersed droplets of the aqueous emulsion I. Advantageously, the feed stream II comprises exclusively compounds I. This variant of the process of the invention is particularly favorable when it is desired that the resulting aqueous polymer dispersions should have a high solids content. However, an aqueous monomer emulsion of the compounds I is also suitable in principle as feed stream II.

Very simply, the process of the invention can be carried out such that some water is charged to the polymerization vessel, the initial charge of water is heated to the polymerization temperature, and then, by way of spatially separate feed ports, the aqueous emulsion I, as feed stream I, and the free-radical polymerization initiator, generally as an aqueous solution, are supplied continuously to the polymerization vessel, while the polymerization is maintained. In this case, the feed stream II will advantageously be supplied synchronously to the aqueous emulsion I. Alternatively, it is possible for the feed stream II to accompany the continuous supply of the aqueous emulsion I only at certain times. In addition, the feed stream II may extend beyond the end of the continuous supply of the aqueous emulsion I.

Preferably, however, the process of the invention will be carried out such that up to 50% by weight, or up to 30% by weight, or up to 15% by weight, of the aqueous emulsion I, with or without the addition of water, is charged to the polymerization vessel, the initial charge is heated to the polymerization temperature, free-radical polymerization initiator is added, the resulting mixture is partially polymerized, and then the remainder of the aqueous emulsion I, as feed stream I, is supplied continuously to the polymerization vessel, while the polymerization is maintained, and this feed stream is accompanied by a preferably synchronous, continuous feed stream of polymerization initiator and by a preferably synchronous addition of the feed stream II. In principle, however, it is also possible to charge the total amount of free-radical polymerization initiator to the polymerization vessel. Here too, the feed stream II may only be supplied at certain times, and may also extend beyond the end of the supply of the aqueous emulsion I.

Normally, the overall molar amount of compounds I which are employed as a constituent of the feed stream II (molar amount A) will be less than the overall molar amount of compounds I which are employed as a constituent of the aqueous emulsion I (molar amount B). However, it may also be two or more times this amount.

Suitable free-radical polymerization initiators are in principle all those capable of triggering a free-radical polymerization. These may be either peroxides or hydro-peroxides, or azo compounds. They can be either oil-soluble or water-soluble.

For the process of the invention it is preferred to employ free-radical polymerization initiators of high solubility in water. Examples of such polymerization initiators are peroxodisulfuric acid and its ammonium and alkali metal salts, and also hydrogen peroxide and tert-butyl hydroperoxide. It is of course also possible, as such water-soluble free-radical polymerization initiators, to make use of combined systems composed of at least one reducing agent and at least one peroxide and/or hydroperoxide. Examples of such combinations are tert-butyl hydroperoxide/sodium hydroxymethanesulfinate, and hydrogen peroxide/ascorbic acid.

In the process of the invention the polymerization temperature generally depends on the dissociation temperature of the free-radical polymerization initiator that is employed. Redox initiator systems generally dissociate at particularly low temperatures. Typical polymerization temperatures are from 0 to 100° C., frequently from 30 to 95° C. and, in many cases, from 60 to 90° C. If superatmospheric pressure is employed, they may even be up to 120° C. or more. The reactor is normally evacuated to 100–200 mbar abs. pressure before beginning the polymerization, so that during the polymerization pressures of 0.2–15 bar (depending on the monomer) may occur.

The devices employed in the external circuit are especially suitable for an industrial process regime.

The low-shear pump (or pumps) must have a low shearing effect on the emulsion, withstand pressures of up to 15 bar, for example, be insensitive to gases in the emulsion, permit a good hourly throughput of up to 100 m$^3$/h, preferably up to 60 m$^3$/h and with particular preference up to 45 m$^3$/h, be resistant even to temperatures of more than 100° C., and be easy to clean. Customary rotary piston pumps or gear pumps are unsuitable for the process of the invention. Particularly suitable pumps are nonclogging pumps (vortex pump) which operate in accordance with the vortex principle; also possible are displacement pumps, monopumps or disk flow pumps and any pumps of a type which ensures a minimum of shear forces in order to give little or no disruption to the relatively unstable state of the reaction mixture and of the finished product emulsion. The pumps can preferably be sealed with double floating-ring seals in a back-to-back arrangement.

The heat exchanger or exchangers has or have a substantially laminar flow profile; in other words, the action of shear forces should be minimal and there should, where possible, be no dead zones (that is, zones not traversed by the flow). Known heat exchangers of the plate type tend to be unsuitable, since the narrow gaps and deflections mean that the mechanical resistances offered are too great; moreover, they are less suitable for a highly pressure-resistant configuration and are more difficult to clean.

Figure 2:
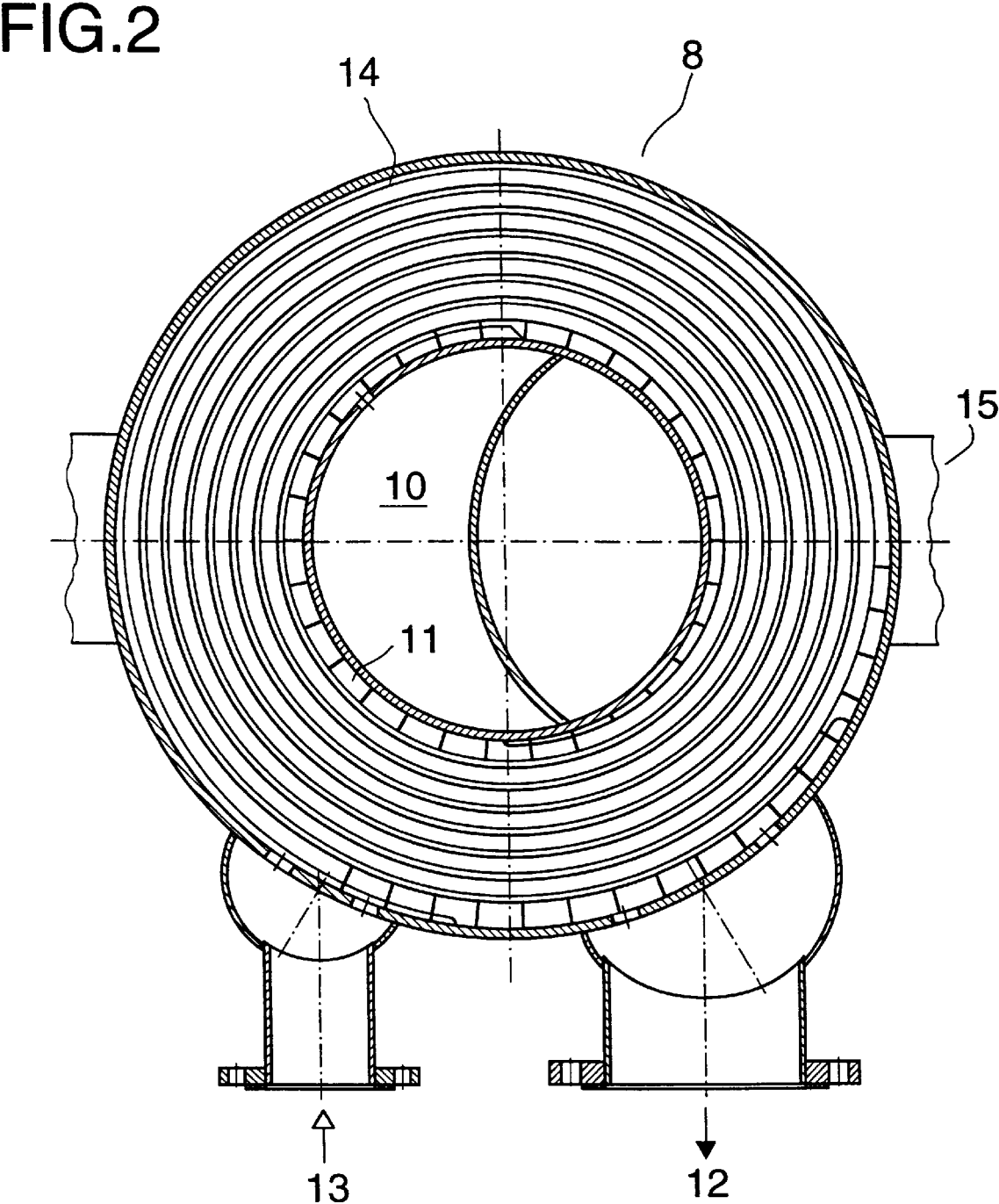

In the drawing, FIG. 1 shows a diagram of the components necessary for the process, and FIG. 2 shows a cross section through the preferred embodiment of the heat exchanger, in plan view.

The aqueous emulsion L any water, the initiator and, if appropriate, the feed stream II are introduced via pipelines 1*a* (miniemulsion feed, feed stream I), 1*b* if appropriate (macroemulsion feed, feed stream HI) and 1*b'* (initiator feed), 1*c* (water and/or any auxiliaries for the initial charge) into the polymerization reactor 2 (designed to operate, for example, to 15 bar) which in turn is fitted with a motorized stirrer 4. The feed streams are passed normally from above into the reactor, but may also be introduced into the reactor from the bottom or laterally. The reactor has a heating/cooling jacket 3 whose circuit 5 is fed with cooling water 5*b* or with steam 5 *b'* and is operated via a pump 5*a*. The finished product from the polymerizaton reactor can be discharged via the pipeline 6 with steam/nitrogen into a stock reservoir vessel 6*a*. The low-shear pump(s) 7, preferably a nonclogging vortex pump, transport(s) the reaction mixture via a pipeline to the heat exchanger or exchangers 8, which are controlled with cooling water 9*a* or steam 9*a'* by way of the circuit 9 using a pump 9*b*. The heat exchanger or exchangers have an essentially laminar flow profile and the exchanger area is in the order of magnitude of 20m$^2$ for a volume of about 0.3 m$^3$. A spiral heat exchanger is preferred. The external circuit leads by way of pipelines back into the reactor 2. The return feed is preferably from the top but may also be introduced into the reactor from the side.

In the spiral heat exchanger 8 the reaction mixture flows from the bottom 10 into the spirally arranged section/ channel 11 of the heat exchanger and out again at the exit 12. The heat exchange medium (for example a coolant or else a heating agent)—judiciously cooling water or brine, which if desired can be heated by means of steam—flows via the inlet 13 into the likewise spirally arranged part 14 of the heat exchanger and out again at the top end (not shown). Preferably, the reaction mixture flows in countercurrent to the heat exchange medium. The wall-to-wall distance in the channel for the reaction mixture is judiciously greater than that in the channel for the heat exchange medium, but may also be of the same or a smaller dimension. The temperature difference from the entry point to the exit point is judiciously from 3 to 60 K, preferably from 5 to 30 K, and, in particular, from 10 to 20 K. The heat exchanger can if desired be mounted on the suspension 15 so as to be movable (for example for rotation through 90° or 180 degrees).

In a particularly judicious embodiment of the invention the heat exchanger or exchangers are arranged horizontally in relation to the polymerization reactor, so that the reaction mixture is "stationary" in the heat exchanger; in other words, the heat exchanger can be emptied completely after the end of the polymerization, which is normally carried out discontinuously, complete emptying being desirable for reasons of product homogeneity and product purity. At the bottom end the heat exchanger may have additional emptying valves (not shown).

The throughput of reaction mixture through the external circuit is generally from 5 to 100 $m^3/h$ (measured at the pump 7), preferably from 10 to 60 $m^3/h$ and with particular preference from 15 to 45 $m^3/h$. The overall content of the external circuit (not including the cooling circuits) is about 0.5 $m^3$.

The monitoring and control of the respective heating/cooling circuits of the polymerization reactor and/or of the heat exchanger or exchangers are expediently carried out by means of a cascade control; in other words, a first temperature measurement is normally made inside the polymerization reactor, a second in the heating/cooling circuit of this reactor, in combination with that of the reaction mixture in the pipeline after leaving the heat exchanger, and a third in the pipeline after leaving the heat exchanger in combination with that of the heating/cooling circuit of the heat exchanger.

In comparison with the prior art, the homopolymers and copolymers prepared in accordance with the invention can be produced in a good yield within short times and show no deterioration in performance properties.

We claim:

1. A process for preparing an aqueous polymer dispersion by free-radically initiated polymerization of free-radically polymerizable compounds I whose individual solubility in water under the conditions (pressure, temperature) of the free-radically initiated polymerization is $\geq 0.001\%$ by weight and whose polymer particles also comprise further compounds II whose solubility in water under the conditions of the free-radically initiated polymerization is $\leq 0.001\%$ by weight, in which process a) at least one compound I and at least one compound II are admixed used to prepare an oil-in-water miniemulsion (emulsion I) whose disperse phase consists essentially of droplets having a diameter $\leq 500$ nm and b) at least a portion of the emulsion I is supplied continuously, as feed stream I to a reaction vessel in the course of continuing free-radical polymerization, wherein the reaction mixture is agitated by an external circuit which leads from and back to the reaction vessel and which comprises at least one low-shear pump and at least one heat exchanger having an essentially laminar flow profile.

2. A process as claimed in claim 1, wherein the feed stream I is accompanied by at least one further feed stream II, with the proviso that the feed stream II is selected from the group consisting of a feed stream of another part of the compounds I, is an oil-in-water macroemulsion of the compounds I (emulsion II) whose disperse phase consists essentially of droplets having a diameter $\geq 1000$ nm, and a mixture thereof.

3. A process as claimed in claim 1, wherein the polymerization temperature is from 0 to 120° C.

4. A process as claimed in claim 1, wherein the compounds I consist of

| | |
|---|---|
| a) from 80 to 100% by weight | of at least one monomer from the group consisting of styrene, α-methylstyrene, vinyltoluenes, esters of $C_3$—$C_6$ α, β-mono-ethylenically unsaturated carboxylic acids and $C_1$—$C_{12}$-alkanols, butadiene and also vinyl esters and allyl esters of $C_1$—$C_{12}$ alkane carboxylic acids (monomers A) and |
| b) from 0 to 20% by weight | of other compounds I containing at least one ethylenically unsaturated group (monomers B) | and, optimally, from 0.01 to 2% by weight, based on the sum of the monomers A and B, of molecular weight regulators.

5. A process as claimed in claim 4, wherein the monomers A are selected from the group consisting of n-butyl acrylate, 2-ethylhexyl acrylate, methyl methacrylate and styrene.

6. A process as claimed in of claim 4, wherein the monomers B are selected from the group consisting of acrylamide, methacrylamide, acrylic acid, acrylonitrile, methacrylonitrile, 2-acryloamido-2-methylpropanesulfonic acid, vinyl-pyrrolidone, hydroxyethyl acrylate, hydroxymethyl acrylate, hydroxypropyl acrylate, hydroxypropyl methacrylate, quaternized vinylimidazole, N,N-dialkylaminoalkyl (meth)acrylates, N,N-dialkylaminoalkyl (meth)acrylamides, trialkylammoniumalkyl (meth)acrylates and trialkylammoniumalkyl(meth)-acrylamides.

* * * * *

UNITED STATES PATENT AND TRADEMARK OFFICE
CERTIFICATE OF CORRECTION

PATENT NO.   : 6,117,939
DATED        : September 12, 2000
INVENTOR(S)  : Klemens Mathauer et al.

It is certified that error appears in the above-identified patent and that said Letters Patent is hereby corrected as shown below:

Column 10,
Line 15, "the feed stream II is selected from" should read -- the feed stream II is at least one selected from --.
Line 17, "compounds I, is an oil-in-water" should read
-- compounds I, an oil-in-water --.

Signed and Sealed this

Tenth Day of May, 2005

JON W. DUDAS
*Director of the United States Patent and Trademark Office*